(12) United States Patent
Richardson et al.

(10) Patent No.: US 9,735,624 B2
(45) Date of Patent: Aug. 15, 2017

(54) DEVICE FOR THE TRANSMISSION OF AN ELECTROMAGNETIC SIGNAL

(71) Applicant: Roke Manor Research Limited, Romsey, Hampshire (GB)

(72) Inventors: Christopher Keith Richardson, Romsey (GB); Mark Hickson, Romsey (GB)

(73) Assignee: Roke Manor Research Limited, Romsey Hampshire (GB)

( * ) Notice: Subject to any disclaimer, the term of this patent is extended or adjusted under 35 U.S.C. 154(b) by 783 days.

(21) Appl. No.: 14/157,987

(22) Filed: Jan. 17, 2014

(65) Prior Publication Data

US 2014/0203667 A1   Jul. 24, 2014

(30) Foreign Application Priority Data

Jan. 18, 2013 (GB) .................................. 1300927.9

(51) Int. Cl.
   *H02J 17/00* (2006.01)
   *H02N 1/08* (2006.01)
(52) U.S. Cl.
   CPC .............. *H02J 17/00* (2013.01); *H02N 1/08* (2013.01)
(58) Field of Classification Search
   None
   See application file for complete search history.

(56) References Cited

U.S. PATENT DOCUMENTS

| | | |
|---|---|---|
| 2006/0113862 A1 | 6/2006 | Suzuki et al. |
| 2008/0048521 A1 | 2/2008 | Mabuchi et al. |

(Continued)

FOREIGN PATENT DOCUMENTS

| | | |
|---|---|---|
| EP | 2237004 A1 | 10/2010 |
| GB | 651153 A | 3/1951 |

(Continued)

OTHER PUBLICATIONS

Search Report for GB1300927.9, dated Jun. 11, 2013.

(Continued)

*Primary Examiner* — Jeffrey Shin
(74) *Attorney, Agent, or Firm* — Banner & Witcoff, Ltd.

(57) ABSTRACT

A device for the transmission of electromagnetic signals, the device comprising: a conductive element at least one inducer, for inducing charge in said conductive element; a transmission circuit, for generation and transmission of electromagnetic signals; wherein said conductive element and said at least one inducer are movable, with respect to each other, between a plurality of relative positions; in a first position of said relative positions, said at least one inducer is arranged to induce a charge in said conductive element; in a second position of said relative positions, said conductive element is arranged to discharge; the conductive element is arranged to couple with the transmission circuit, in said first position and/or said second position, such that charging and/or discharging of said conductive element causes the transmission circuit to generate and transmit an electromagnetic signal; and the device is arranged such that movement of said device causes relative movement of said conductive element and said at least one inducer between said plurality of relative positions.

20 Claims, 5 Drawing Sheets

(56) References Cited

U.S. PATENT DOCUMENTS

2012/0176609 A1* 7/2012 Seppa ................... G01S 13/753
  356/227
2013/0076202 A1* 3/2013 Naito ....................... H02N 1/08
  310/300

FOREIGN PATENT DOCUMENTS

WO    03105167 A2   12/2003
WO   201152106 A1    5/2011

OTHER PUBLICATIONS

Juji Suzuki, "Energy Harvesting from Vibration Using Polymer Electret." International Symposium on Micro-NanoMechatoronics and Human Science. Nov. 2008, pp. 180-183.
Communication with European Search Report for EP14151630.2 dated Sep. 16, 2016.

* cited by examiner

DEVICE FOR THE TRANSMISSION OF AN ELECTROMAGNETIC SIGNAL

CROSS REFERENCE TO RELATED APPLICATIONS

This application claims priority from United Kingdom Patent Application No. 1300927.9, filed on Jan. 18, 2013. The priority application is herein incorporated by reference in its entirety

BACKGROUND

Energy harvesting is the process of capturing and storing small amounts of energy for use in a variety of application. One of the most common types of energy harvesting involves the transfer of energy from small movements in a device into electricity. For example, many watches capture user movement to power the watch mechanism. Energy harvesting using electrets has been proposed by Juji Suzuki, in his article Energy Harvesting from Vibration Using Polymer Electret (SUZUKI, Y. Energy Harvesting from Vibration Polymer Electret. International Symposium on Micro-Nano Mechatronics and Human Science. November 2008, pages 180 to 183).

SUMMARY

A first aspect provides a device for the transmission of electromagnetic signals, the device comprising: a conductive element at least one inducer, for inducing charge in said conductive element; a transmission circuit, for generation and transmission of electromagnetic signals; wherein said conductive element and said at least one inducer are movable, with respect to each other, between a plurality of relative positions; in a first position of said relative positions, said at least one inducer is arranged to induce a charge in said conductive element; in a second position of said relative positions, said conductive element is arranged to discharge; the conductive element is arranged to couple with the transmission circuit, in said first position and/or said second position, such that charging and/or discharging of said conductive element causes the transmission circuit to generate and transmit an electromagnetic signal; and the device is arranged such that movement of said device causes relative movement of said conductive element and said at least one inducer between said plurality of relative positions.

A second aspect provides a method of transmitting an electromagnetic signal using a device comprising: a conductive element; at least one inducer, for inducing charge in said conductive element; and a transmission circuit, for generation and transmission of electromagnetic signals; wherein said conductive element and said at least one inducer are movable, with respect to each other, between a plurality of relative positions; the method comprising: moving the device in a first direction to cause the conductive element and at least one inducer to move relatively closer to one another, thereby causing said at least one inducer to induce a charge in the conductive element; and moving the device in a second direction to cause the conductive element and at least one inducer to move relatively apart from one another, thereby causing the conductive element to discharge; wherein said steps of charging and/or discharging occur through said transmission circuit and cause the transmission circuit to generate and transmit an electromagnetic signal.

Further features of embodiments are recited in the appended claims.

BRIEF DESCRIPTION OF THE DRAWINGS

Embodiments will now be described, by way of example only, with reference to the accompanying drawings, in which.

DETAILED DESCRIPTION

Figure 1:
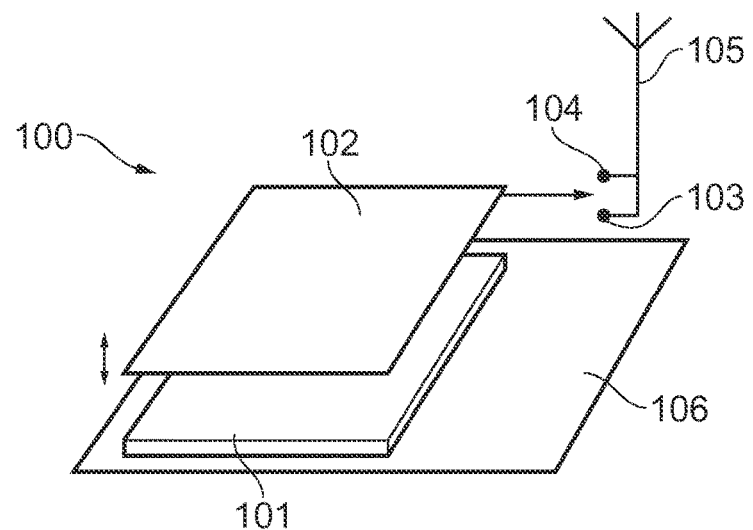
FIG. 1 is a perspective diagram of a device in accordance with a first embodiment.

FIG. 1 is a simplified diagram of an RF (radio frequency) device 100 in accordance with an embodiment. The device 100 includes an electret 101 and a conductive plate 102. The electret 101 and the conductive plate 102 are arranged in parallel. The conductive plate 102 is arranged to move between a first position in which it is in contact with the electret 101 and a second position in which it is separated from the elecret 101. In FIG. 1, the conductive plate is shown between the first and second positions. The device 100 also includes a first contact 103, a second contact 104 and an antenna 105. Both contacts 103, 104 are coupled to the antenna 105. The device 100 also includes a resonant circuit, which is not shown in FIG. 1. The resonant circuit is also coupled to the antenna 105. The device 100 further includes a ground plane 106, to which the electret 101 and the resonant circuit are coupled.

When the device is physically shaken or moved, the conductive plate 102 moves between the first and second positions. The electret 101 is an insulating material with an implanted fixed charge. The electret 101 produces a strong electric field in the area through which the conductive plate 102 moves. As the conductive plate 102 moves, a charge is induced in the plate. In this sense, the conductive plate is an inducer. The conductive plate 102 discharges through the contacts 103, 104, causing the resonant circuit to resonate, and an RF signal to be transmitted from the antenna 105. All of the energy used to generate the signal is derived from the movement of the device. No energy is drawn from the electret itself.

Figure 2:
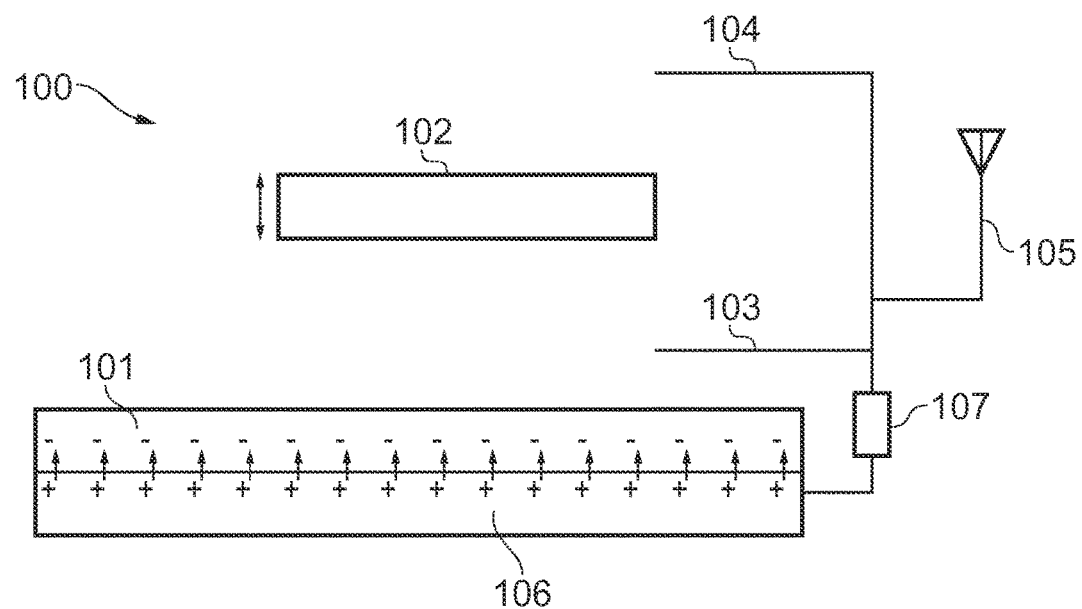
FIG. 2 is a side-view diagram of the device shown in FIG. 1 in operation.

FIG. 2 is a more detailed diagram of the device 100 shown in FIG. 1. All of the components shown in FIG. 1 are also shown in FIG. 2. In addition, resonant circuit 107 is shown in FIG. 2, coupled between the groundplane 106 and the antenna 105. In FIG. 2, the conductive plate 102 is shown to be moveable in a direction perpendicular to the plane of the electret 101. However, in alternative embodiments, the conductive plate 102 may move side-to-side or rotate relative to the electret, as will be described in more detail below.

The electret 101 is positioned parallel and adjacent to the groundplane 106. Here, the eletret 101 is positioned in contact with the groundplane 106, and the groundplane 106 is a metal backplate. The electret 101 has an implanted negative charge. There is an induced positive charge in the groundplane 106. This induced charge is a result of the electret charging process. In FIG. 2, the first contact 103 is located close to the electret 101. The second contact 104 is situated close to the conductive plate's second position. When the conductive plate 102 is in the first position, it makes contact with the first contact 103 and the electret 101. When the conductive plate 102 is in the second position, it makes contact with the second contact 104 and is separated from the electret 101.

As noted above, the device 100 is designed such that motion of the device results in the conductive plate 102 moving toward and away from the electret 101. Initially, to a first order approximation, the entire electric field (E-field) is contained within the electret 101. The E-field in the electret 101 is dependent on: the charge density, σ; the area, A; and the permittivity, ε.

$$E = \frac{\sigma A}{\varepsilon} \quad (1)$$

The surface voltage of the electret 101 and the groundplane 106 is determined by the charge and the distance of separation between the electret 101 and the groundplane 106.

$$V = E \cdot d \quad (2)$$

where d is the distance of separation.

Figure 3:
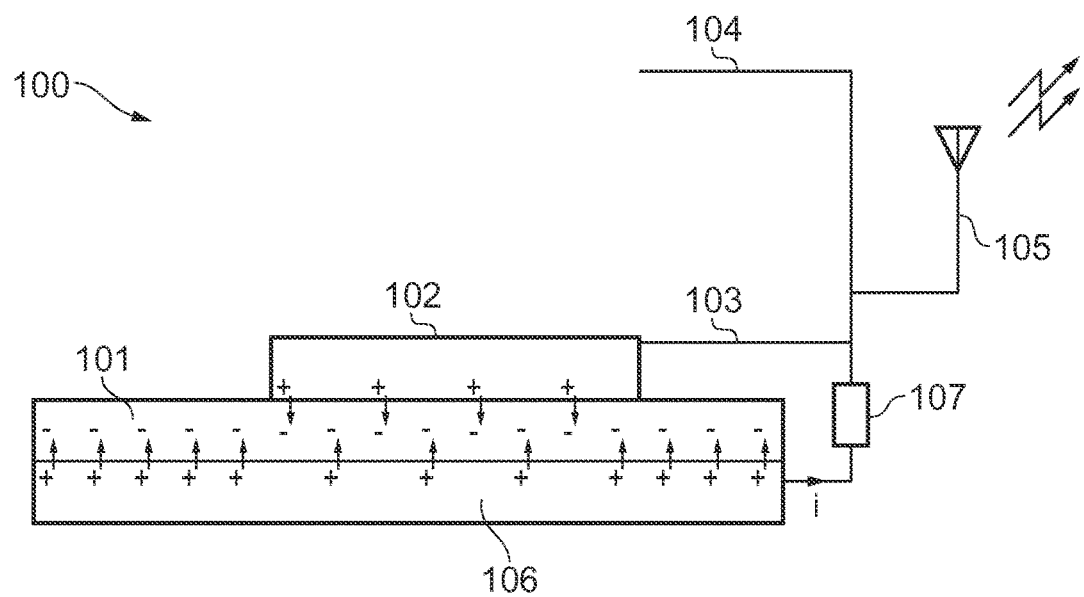
FIG. 3 is a further side-view diagram of the device shown in FIG. 1 in operation.

FIG. 3 shows the device 100 when the conductive plate 102 is in the first position and is in contact with the elecret 101 and first contact 103. Charge redistributes between the conductive plate 102 and the groundplane 106 as they have to be at the same potential. Current i flows through the resonant circuit 107 and the antenna 105 radiates energy. Assuming that conductive plate 102 and the groundplane 106 are equidistant from the charge in the electret, 50% of the charge is transferred onto the conductive plate 102. It should be noted that the conductive plate 102 and the electret 101 do not need to make contact. For example, in this embodiment, the conductive plate 102 and the electret 101 may move close to the charged electret, and make contact with the groundplane 106. Such an arrangement would also be effective at charging the conductive plate 102.

Figure 4:
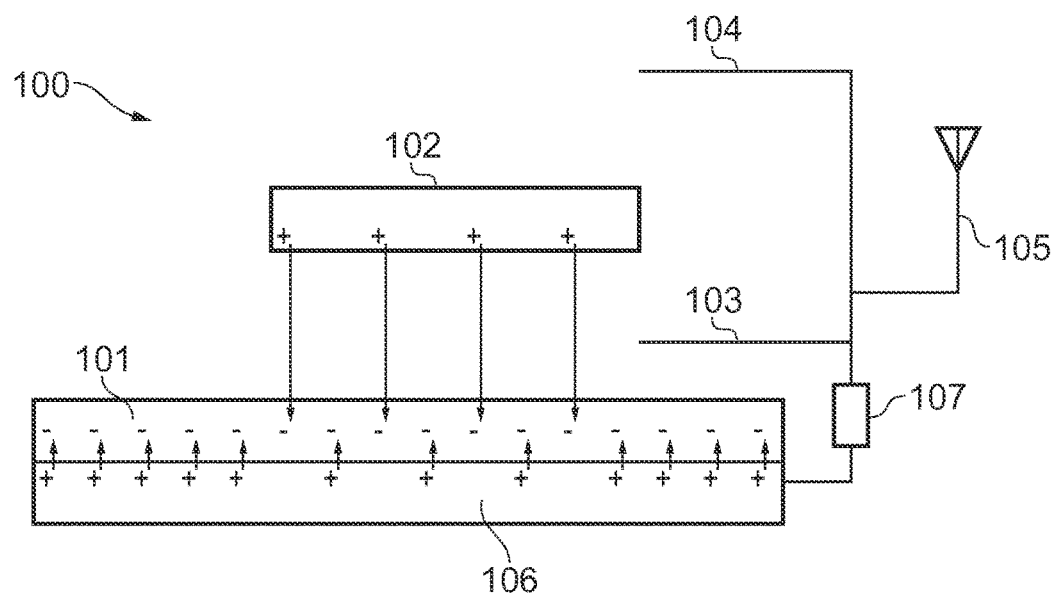
FIG. 4 is a further side-view diagram of the device shown in FIG. 1 in operation.

If the direction of motion (of the device 100) is now reversed, the conductive plate 102 moves away from the electret 101. The charge on the conductive plate 102 is captured as no circuit is made with the groundplane 106. This is shown in FIG. 4.

As the motion forces the conductive plate 102 and electret 101 apart, work is being done. The electric field between the conductive plate 102 and the electret 101 remains constant since the captured charge remains constant:

$$E = \frac{Q}{\varepsilon_0} \quad (3)$$

As described above, the electric field is constant but the separation (d) is increased. Therefore, the voltage on the conductive plate 102 increases since:

$$V = E \cdot d \quad (4)$$

Figure 5:
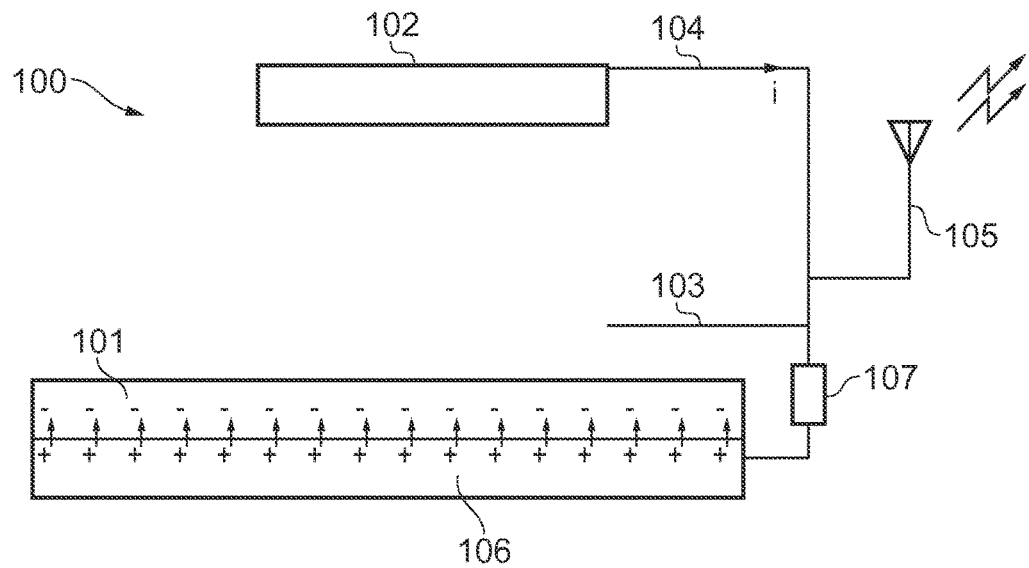
FIG. 5 is a further side-view diagram of the device shown in FIG. 1 in operation.

In the second position, the conductive plate 102 contacts with the second contact 104 and makes a circuit with the groundplane 106, as shown in FIG. 5. To a first approximation, the charge reverts to the initial state with all the charge residing in the groundplane 106. The current i that results flows through the resonant circuit and results in radiation from the antenna 105.

The energy scavenging device 100 described above requires that a metal structure (the conductive plate 102) moves close to an electret (the electret 101) and that additional motion moves the now charged metal away from the electret. Once separated, the metal structure is connected to the groundplane discharging the metal structure. Accordingly, so long as these requirements are met, it is possible to design structures to scavenge energy from different types of motion, for example rotational and sliding motion.

Figure 6:
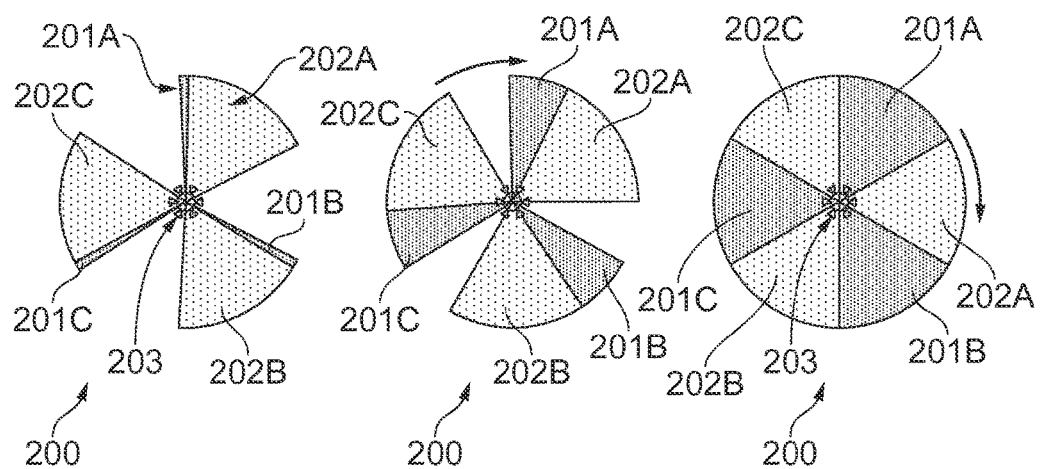
FIG. 6 shows a device in accordance with a second embodiment.

FIG. 6 shows a device 200 that could be used to scavenge energy from rotational movement. Sectors of metal backed electret 201A, 201B, 201C are aligned with a rotating metal element 202 made up of similar sectors 202A, 202B, 202C. A commutator 203 is used to make and break the required connections. As the rotating element sectors 202 and electret sectors 201 align, a connection is made, thereby charging the rotating element, as shown in the left-hand diagram. The rotation continues and the voltage on the element 202 is increased as the distance between the charged electret 201 and the rotating metal 202 is increased, as shown in the centre-most diagram. When the rotation elements 202 are maximally misaligned with the electret 201, the commutator 203 remakes the contact and the charge flows back to the starting condition. At each contact current flows through a resonant circuit resulting in energy being radiated from the attached antenna.

Figure 7:
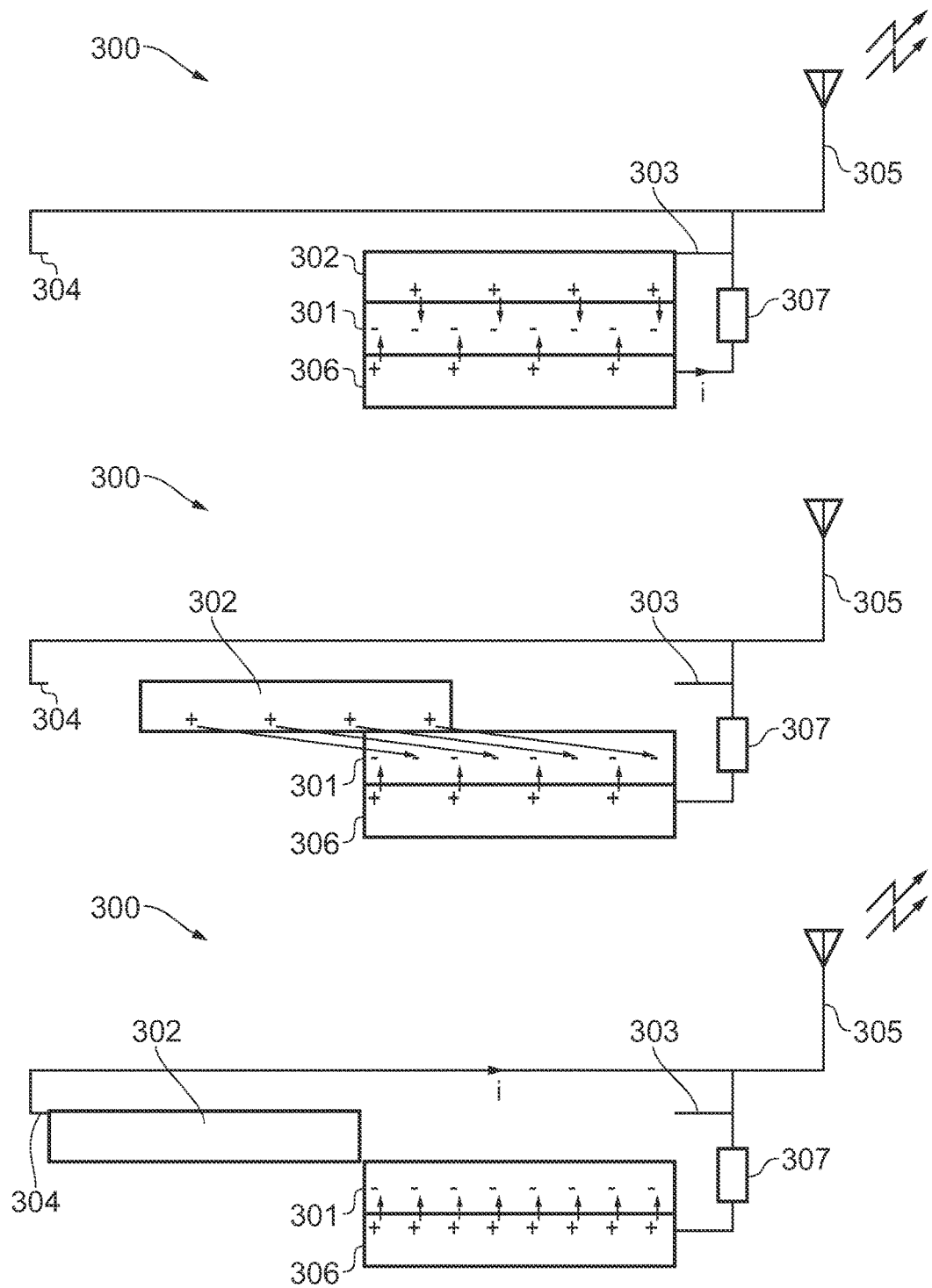
FIG. 7 shows a device in accordance with a third embodiment.

A thinner solution to that shown in FIGS. 1 to 5, in which the conductive plate slides over the charged electret, is shown in FIG. 7. The basic operating principle, however, remains the same. FIG. 7 shows an RF (radio frequency) device 300 in accordance with an embodiment. The device 300 includes an electret 301 and a conductive plate 302. The electret 301 and the conductive plate 302 are arranged in parallel. The conductive plate 302 is arranged to move between a first position in which it may be in contact with the electret 301 (as noted above, the conductive plate may be in contact with the electret, but is not required to be in contact with the electret) and a second position in which it is separated from the elecret 301. The device 300 also includes a first contact 303, a second contact 304 and an antenna 305. Both contacts 303, 304 are coupled to the antenna 305. The device 300 also includes a resonant circuit 307. The resonant circuit is also coupled to the antenna 305. The device 300 further includes a ground plane 306, to which the electret 301 and the resonant circuit 307 are coupled. In use, the conductive plate slides from side-to-side. Other than the direction of movement, the device 300 operates in the same manner as that described above in connection with FIGS. 1 to 5.

Figure 8:
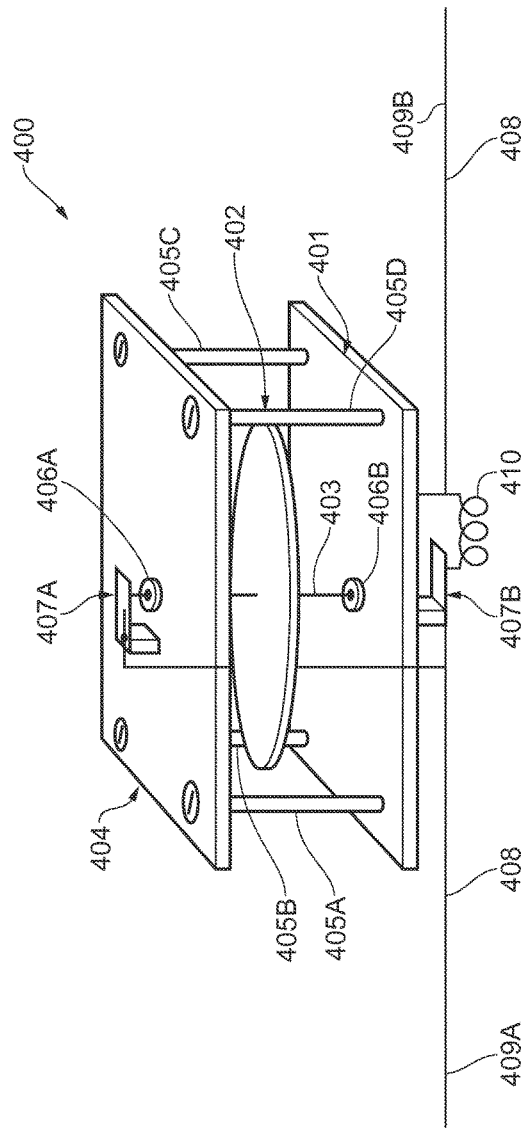
FIG. 8 shows a device in accordance with a fourth embodiment.

FIG. 8 is a more detailed diagram of an implementation of the device shown in FIGS. 1 to 5. FIG. 8 shows a device 400. The device 400 includes an electret coated aluminium plate 401, which is equivalent to the electret 101. The device 400 also includes the a disk 402, which is equivalent to the conductive plate 102. The disk 402 measures around 19 mm in diameter. The metal disk includes a copper spindle 403. The copper spindle is axially mounted through the electret coated aluminium plate 401.

The device 400 also includes an uncoated metal plate 404. The uncoated metal plate 404 and the electret coated aluminium plate 401 are connected by four supporting arms 405A-D. The electret coated aluminium plate 401 and the uncoated metal plate 404 are both the same size and shape. They are each square in shape, and have a nominal thickness. Each supporting arm 405A-D is positioned towards a respective corner of each plate. Each plate has a spindle supporting hole 406A, 406B towards its centre. The spindle 403 is supported through these holes such that the disk 402 may move back and forth along the axis of the spindle 403.

The device 400 also includes insulted contacts 407A, 407B. Insulated contact 407A, is positioned on a side of the uncoated metal plate 404 opposite to the side of the electret 401. Insulated contact 407B is positioned on a side of the electret 401 opposite the side of the uncoated metal plate 404. The disk 402 moves between two end positions. In a first position, the disk 402 contacts or moves adjacent to the electret 401. In a second position, the disk 402 is positioned closer to the uncoated metal plate 404. In the first position, the spindle 403 contacts with insulted conductor 407B. In the second position, the spindle 403 contacts with insulated conductor 407A.

The device 400 also includes a dipole antenna 408. The dipole antenna includes a first arm 409A and a second arm 409B. The first arm 409A is coupled at one end to the insulated contacts 407A, 407B. The second arm 409B is coupled at one end to the electret 401. A tuning coil 410 is coupled between the first arm 409A and the second arm 409B of antenna 408.

In use, the disk 402 moves between the electret 401 and the uncoated metal plate 404. Charge is induced into the disk 402 when it is positioned adjacent to the electret 401. In that same position, current flows through the spindle 403 and causes the tuning coil 410 to resonate, and an RF signal is transmitted by the dipole antenna 408. As the disk 402 moves away from electret 401, it maintains a charge. This is then discharged through the spindle 403 when the disc 402 reaches the other discharge position, again causing the antenna to transmit an RF signal.

Embodiments provide a means of achieving low cost communications and tagging without the need for a power supply or batteries. The pulse characteristics make it ideal for finding the direction of a tag. There are many possible applications including: emergency beacons; telemetry equipment; low-cost tagging; movement detection; low-data communication links; and position fixing/identifying.

In the embodiment described in connection with FIGS. 1 to 5, the conductive plate 102 is arranged to move and the electret is fixed. In an alternative embodiment, the conductive plate may be fixed, and the electret may be arranged to move.

In the embodiment described in connection with FIGS. 1 to 5, the electret is described as having a negative charge, and the conductive plate accordingly takes a positive charge. In an alternative embodiment, the electret may be positively charged, and the conductive plate may take a negative charge.

In the embodiment described in connection with FIGS. 1 to 5, only a single electret is described. In an alternative embodiment, the device includes two electrets. The conductive plate is arranged to move between the two plates. The electrets would be oppositely charged in such an arrangement. Twice the amount of work would be required to move the conductor between two electrets, with the result that twice the energy would be scavenged and transmitted.

In the embodiment described in connection with FIGS. 1 to 5, the conductive plate approaches the electret, in order for charge to induced in the plate. In an alternative embodiment, no groundplane is required. In such an embodiment, static charge induction is used to charge the conductor.

In the embodiment described in connection with FIGS. 1 to 5, the conductive plate discharges through the resonant circuit when the plate is in contact with the electret. In an alternative embodiment, the conductive plate does not discharge at this point. Instead, the conductive plate only discharges when it is at the second discharge position.

The above-described embodiments include a device which is suitable for RF transmission. It will be appreciated that such devices may also be arranged to operate at microwave frequencies.

It will be appreciated that the afore-mentioned description is not limiting. Variations are possible without departing from the spirit and scope set forth in the claims. While particular combinations of features have been set forth in the description and claims, it will be appreciated that other combinations are possible within the scope of the claims.

The invention claimed is:

1. A device for transmission of electromagnetic signals, the device comprising:
    a conductive element;
    at least one inducer, for inducing charge in said conductive element;
    a transmission circuit, for generation and transmission of electromagnetic signals; wherein
    said conductive element and said at least one inducer are movable, with respect to each other, between a plurality of relative positions;
    in a first position of said relative positions, said at least one inducer is arranged to induce a charge in said conductive element;
    in a second position of said relative positions, said conductive element is arranged to discharge;
    the conductive element is arranged to couple with the transmission circuit, in said first position and/or said second position, such that charging and/or discharging of said conductive element causes the transmission circuit to generate and transmit an electromagnetic signal; and
    the device is arranged such that movement of said device causes relative movement of said conductive element and said at least one inducer between said plurality of relative positions.

2. A device according to claim 1, wherein said at least one inducer is an insulating material with an implanted charge.

3. A device according to claim 2, wherein said at least one inducer is an electret.

4. A device according to claim 3, wherein said at least one inducer includes a conductive member, positioned on or adjacent said electret, and said electret is arranged to induce a charge in said conductive member.

5. A device according to claim 4, wherein, in said first position said inducer and said conductive element are positioned on or adjacent each other, and said conductive element is coupled to said conductive member, such that charge is transferred from said conductive member to said conductive element, thereby causing the transmission circuit to generate and transmit the electromagnetic signal.

6. A device according to claim 5, further comprising: a first contact, coupled to said transmission circuit; wherein said conductive element is arranged to make an electrical connection with said first contact when said conductive element and conductive member are in said first position.

7. A device according to claim 1, wherein, in said second position, said inducer and said conductive element are positioned spaced from each other, and said conductive element is coupled to a conductive member, such that charge is transferred from said conductive element to said conductive member, thereby causing the transmission circuit to generate and transmit the electromagnetic signal.

8. A device according to claim 7, further comprising: a second contact, coupled to said transmission circuit; wherein said conductive element is arranged to make an electrical connection with said second contact when said conductive element and conductive member are in said second position.

9. A device according to claim 1, wherein the conductive element is moveable and the at least one inducer is fixed.

10. A device according to claim 1, wherein said transmission circuit includes a resonant circuit and an antenna.

11. A device according to claim 9, wherein said conductive element is arranged to move linearly, with respect to the at least one inducer.

12. A device according to claim 11, wherein said conductive element and said at least one inducer are arranged in parallel with each other, and said conductive element is arranged to move in a direction perpendicular to said at least one inducer.

13. A device according to claim 11, wherein said conductive element and said at least one inducer are arranged in parallel with each other, and said conductive element is arranged to move in a direction parallel to said at least one inducer.

14. A device according to claim 9, wherein said conductive element is arranged to move in a circular manner.

15. A device according to claim 14, further comprising an axis, around which said conductive element is arranged to rotate.

16. A device according to claim 15, further comprising a plurality of commutators, arranged to couple said conductive element to said at least one inducer during rotation.

17. A device according to claim 1, wherein said electromagnetic signal is either a radio frequency or a microwave signal.

18. A device according to claim 1, wherein said conductive element is metal.

19. A device according to claim 1, wherein a range of motion of said conductive element is limited.

20. A method of transmitting an electromagnetic signal using a device comprising: a conductive element; at least one inducer, for inducing charge in said conductive element; and a transmission circuit, for generation and transmission of electromagnetic signals; wherein said conductive element and said at least one inducer are movable, with respect to each other, between a plurality of relative positions; the method comprising:

moving the device in a first direction to cause the conductive element and at least one inducer to move relatively closer to one another, thereby causing said at least one inducer to induce a charge in the conductive element; and moving the device in a second direction to cause the conductive element and at least one inducer to move relatively apart from one another, thereby causing the conductive element to discharge; wherein said steps of charging and/or discharging occur through said transmission circuit and cause the transmission circuit to generate and transmit an electromagnetic signal.

* * * * *